US010562360B2

(12) United States Patent
Zaleski, Sr. et al.

(10) Patent No.: US 10,562,360 B2
(45) Date of Patent: Feb. 18, 2020

(54) TREAD COVER FOR A WHEEL (71) Applicants: Tom Zaleski, Sr., Edmonton (CA);
Tom Zaleski, Jr., Edmonton (CA)

(72) Inventors: Tom Zaleski, Sr., Edmonton (CA);
Tom Zaleski, Jr., Edmonton (CA)

( * ) Notice: Subject to any disclaimer, the term of this patent is extended or adjusted under 35 U.S.C. 154(b) by 458 days.

(21) Appl. No.: 15/087,829

(22) Filed: Mar. 31, 2016

(65) Prior Publication Data

US 2016/0368333 A1   Dec. 22, 2016

Related U.S. Application Data

(60) Provisional application No. 62/180,388, filed on Jun. 16, 2015.

(51) Int. Cl.
*B60C 27/22* (2006.01)
*B60C 27/06* (2006.01)

(52) U.S. Cl.
CPC .......... *B60C 27/063* (2013.01); *B60C 27/064* (2013.01); *B60C 27/068* (2013.01); *B60C 27/22* (2013.01)

(58) Field of Classification Search
CPC . B60C 27/063; B60C 27/068; B60C 27/0276; B60C 27/0269; B60C 27/22; B60C 27/064
USPC ........................................................ 152/220
See application file for complete search history.

(56) References Cited

U.S. PATENT DOCUMENTS

| 1,598,278 | A | | 8/1926 | Hill | |
|---|---|---|---|---|---|
| 1,775,008 | A | * | 9/1930 | Waters | ..................... B60C 27/22 152/327 |
| 2,318,918 | A | * | 5/1943 | Austin | ..................... B60C 27/22 152/182 |
| 2,416,862 | A | * | 3/1947 | Baker | ..................... B60B 11/06 301/13.1 |
| 2,467,017 | A | * | 4/1949 | Eger | ....................... B60C 27/16 152/220 |
| 2,898,965 | A | | 8/1959 | Eddy | |
| 2,992,863 | A | * | 7/1961 | Fredricks | ........... B62D 55/0963 152/220 |
| 2,998,043 | A | * | 8/1961 | Patrick | ..................... B60C 27/22 152/220 |
| 3,581,797 | A | * | 6/1971 | Kinnucan | ............... B60C 27/22 152/220 |
| 3,696,852 | A | | 10/1972 | Oulman | |

(Continued)

FOREIGN PATENT DOCUMENTS

| CA | 2 709 562 C | 1/2012 |
|---|---|---|
| CN | 86204127 U | 5/1987 |

(Continued)

*Primary Examiner* — Scott A Browne
(74) *Attorney, Agent, or Firm* — Christensen O'Connor Johnson Kindness, PLLC (57) ABSTRACT

There is provided a traction cover for a wheel. The wheel has an axle, a tire, and a tire support that supports the tire, and the cover has a tread body having an inner engagement surface and an outer tread surface, the inner engagement surface being sized to engage an outer drive surface of the tire. The cover also has attachment points carried by the inner engagement surface of the tread body, an anchor secured relative to the tire support, and one or more attachment members attached between the anchor and the attachment points of the tread body.

13 Claims, 6 Drawing Sheets

(56) References Cited

U.S. PATENT DOCUMENTS

| | | | |
|---|---|---|---|
| 3,935,891 A * | 2/1976 | McCloud | B60C 27/04 |
| | | | 152/225 R |
| D243,599 S | 3/1977 | Gilmartin | |
| 4,010,789 A | 3/1977 | Vidakovic et al. | |
| 4,155,388 A * | 5/1979 | Rajcic | B60C 27/0238 |
| | | | 152/221 |
| 4,271,887 A * | 6/1981 | Holzwarth | B60C 27/22 |
| | | | 152/220 |
| 4,408,646 A | 10/1983 | Forsyth | |
| 4,854,357 A | 8/1989 | Mostafa Taha | |
| 6,478,387 B1 * | 11/2002 | Rayman | B60C 11/0083 |
| | | | 301/36.3 |
| 6,637,840 B2 | 10/2003 | Zaleski et al. | |
| 7,258,405 B2 | 8/2007 | Pringiers | |
| 7,980,282 B2 | 7/2011 | Moyna et al. | |
| 2012/0305152 A1 | 12/2012 | Son | |

FOREIGN PATENT DOCUMENTS

| | | |
|---|---|---|
| FR | 1389519 A | 2/1965 |
| GB | 190904981 A | 10/1909 |
| GB | 271977 A | 6/1927 |
| GB | 2143482 A | 2/1985 |

\* cited by examiner

TREAD COVER FOR A WHEEL

TECHNICAL FIELD

This relates to an anti-spin device for use with an anti-slip tread for a wheel.

BACKGROUND

In certain conditions, such as when the ground is soft or muddy due to moisture, conventional tires on vehicles or equipment are unable to provide sufficient traction or stability, or cause damage to the ground surface. In these circumstances, tracked vehicles are sometimes used as an alternative as they provide a larger engagement surface area. U.S. Pat. No. 6,637,840 (Zaleski et al.) entitled "Track Support Element for Tire Engaging Track" and Canadian Patent No. 2,709,562 (Zaleski) entitled "Removable Tire Tread" describe alternate tracks that can be used to combine some of the benefits of a tracked vehicle with those of a vehicle with wheels.

SUMMARY

According to an aspect, there is provided a traction cover for a wheel, the wheel comprising an axle, a tire, and a tire support that supports the tire, the cover comprising a tread body having an inner engagement surface and an outer tread surface, the inner engagement surface being sized to engage an outer drive surface of the tire, attachment points carried by the inner engagement surface of the tread body, an anchor secured relative to the tire support, and one or more attachment members attached between the anchor and the attachment points of the tread body.

According to another aspect, the attachment points may be carried by a tire engagement member that is mounted to the inner engagement surface of the tread body.

According to another aspect, the tire engagement member may comprise an elongated body that is orientated transversely to the drive surface of the tire.

According to another aspect, the anchor may comprise a disc attached to the tire support.

According to another aspect, the wheel may comprise first and second tires and first and second tire supports mounted to the axle.

According to another aspect, the anchor may be secured between the first and second tire supports.

According to another aspect, the wheel may further comprise a third tire and a third tire support, the third tire support being secured to the second tire support by an extension spool.

According to another aspect, the anchor may be attached to or integrally formed with the extension spool.

According to another aspect, the anchor may comprise an anchor disc and may comprise a plurality of anchor points spaced peripherally around the disc and the one or more attachment members may comprise a plurality of chains or cables, each attachment member being attached between anchor point on the anchor and the attachment points.

According to an aspect, there is provided a system for providing an anti-slip tread on a wheel, the system comprising an axle, a first wheel comprising a first tire and a first tire support that supports the first tire, a second wheel comprising a second tire and a second tire support that supports the second tire, the second tire support being attached to the first tire support, and the first and second tire supports being mounted to the axle, an anchor disc attached between the first and second tire supports, the anchor disc having one or more anchor points, an anti-slip tread mounted to the exterior surface of the tire, a tire engagement member attached to the anti-slip tread having one or more attachment points, and an attachment between the bar and the disc attachment points.

According to an aspect, there is provided a method of preventing a wheel from slipping, the wheel comprising an axle, a tire, and a tire support that supports the tire, the method comprising installing a traction cover on the wheel, the traction cover comprising a tread body having an inner engagement surface and an outer tread surface, the inner engagement surface being sized to engage an outer drive surface of the tire, securing an anchor relative to the tire support of the wheel, and attaching one or more attachment members between the anchor and attachment points carried by the inner engagement surface of the tread body such that the attachment member limits relative movement between the traction cover and the tire support.

According to another aspect, the attachment points may be carried by a tire engagement member that is mounted to the inner engagement surface of the tread body.

According to another aspect, the tire engagement member may comprise an elongated body that is orientated transversely to the drive surface of the tire.

According to another aspect, the anchor may comprise a disc attached to the tire support.

According to another aspect, the wheel may comprise first and second tires and first and second tire supports mounted to the axle.

According to another aspect, the anchor may be secured between the first and second tire supports.

According to another aspect, the wheel may further comprise a third tire and a third tire support, the third tire support being secured to the second tire support by an extension spool.

According to another aspect, the anchor may be attached to or integrally formed with the extension spool.

According to another aspect, the anchor may comprise an anchor disc and may comprise a plurality of anchor points spaced peripherally around the disc and the one or more attachment members may comprise a plurality of chains or cables, each attachment member being attached between anchor point on the anchor and the attachment points.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

An anti-slip device generally identified by reference numeral 10 will now be described with reference to FIGS. 1-7. In some cases it is desired to increase the traction available to a wheel 12, or to change the traction characteristics of a wheel 12, by providing a traction cover 14, as shown in FIG. 2. As the differences between tracked and wheeled vehicles are well known by those skilled in the art, a discussion of the design considerations and benefits of providing such a traction cover 14 will not be provided. It will be understood that, aside from the design considerations discussed herein, that other design characteristics, such as tread design, thickness, etc. may be modified according to the preferences of the user.

Figure 1:
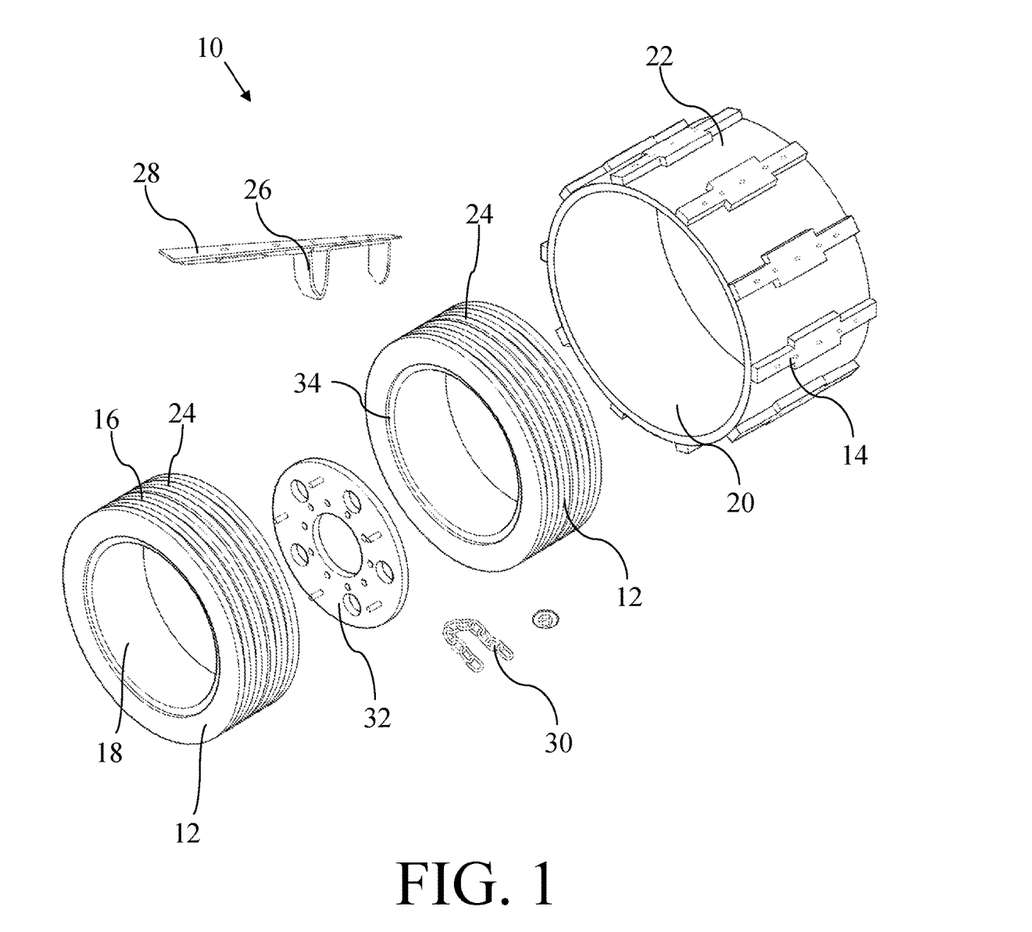
FIG. 1 is an exploded perspective view of a traction cover, a tire support, an anchor, and a wheel.
Figure 2:
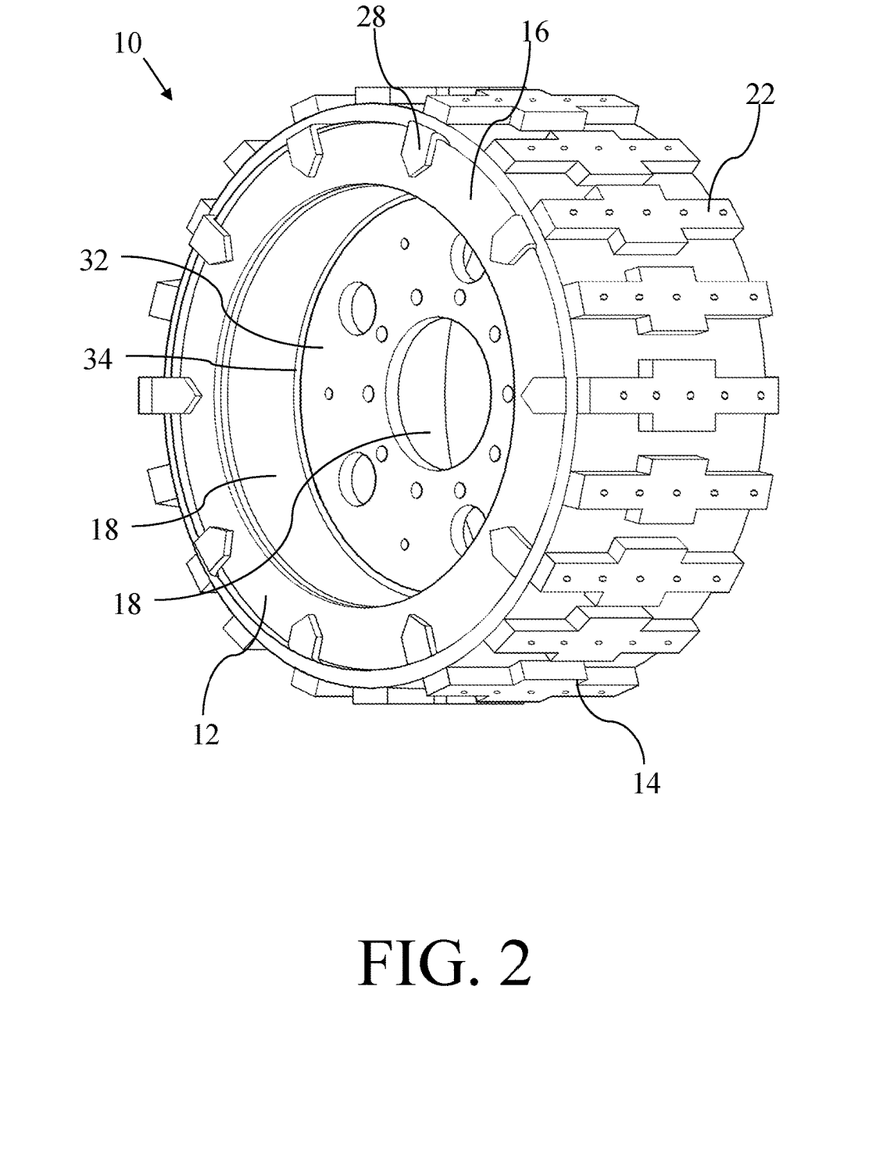
FIG. 2 is a perspective view of a traction cover on a wheel.

Referring to FIG. 1, wheel 12 to which traction cover 14 is attached has an axle (not shown), a tire 16, and a tire support 18 that supports tire 16, such as a wheel or rim. Traction cover 14 has an inner engagement surface 20 and an outer tread surface 22. Inner engagement surface 20 is sized such that it engages an outer drive surface 24 of tire 16.

Referring to FIG. 1, attachment points 26 are carried by inner engagement surface 20 of tread body 14, which are used to secure traction cover 14 relative to rim 18 of wheel 12. Referring to FIG. 1, attachment points 26 may be carried by a tire engagement member 28 that is mounted to inner surface 20 of tread body 14. As shown, tire engagement member 28 may be an elongated body that is oriented transversely to drive surface 24 of tire 16. In the depicted example, tire engagement member 28 is a rigid bar and attachment points 26 are openings that are large enough to receive an attachment member 30, such as a chain as depicted, or a cable, strap or other elongate object that is able to satisfy the demands of the application by providing the necessary strength and resistance to relative movement required in operation. While an elongate attachment member 30 that engages an opening that acts as an attachment point 26 has been found to be relatively easy to manufacture and use, other attachment designs may also be used based on the preferences of the user.

Figure 3:
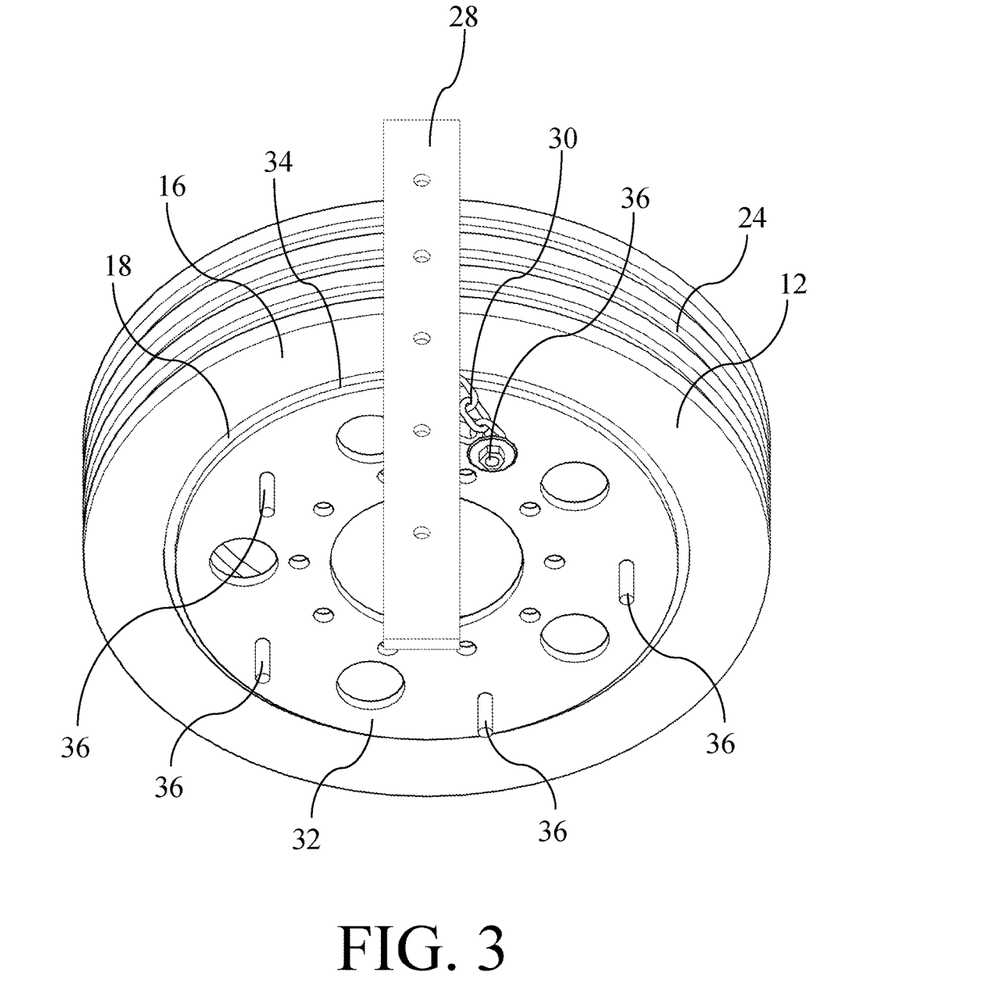
FIG. 3 is a perspective view of an anchor secured to a tire support.
Figure 7:
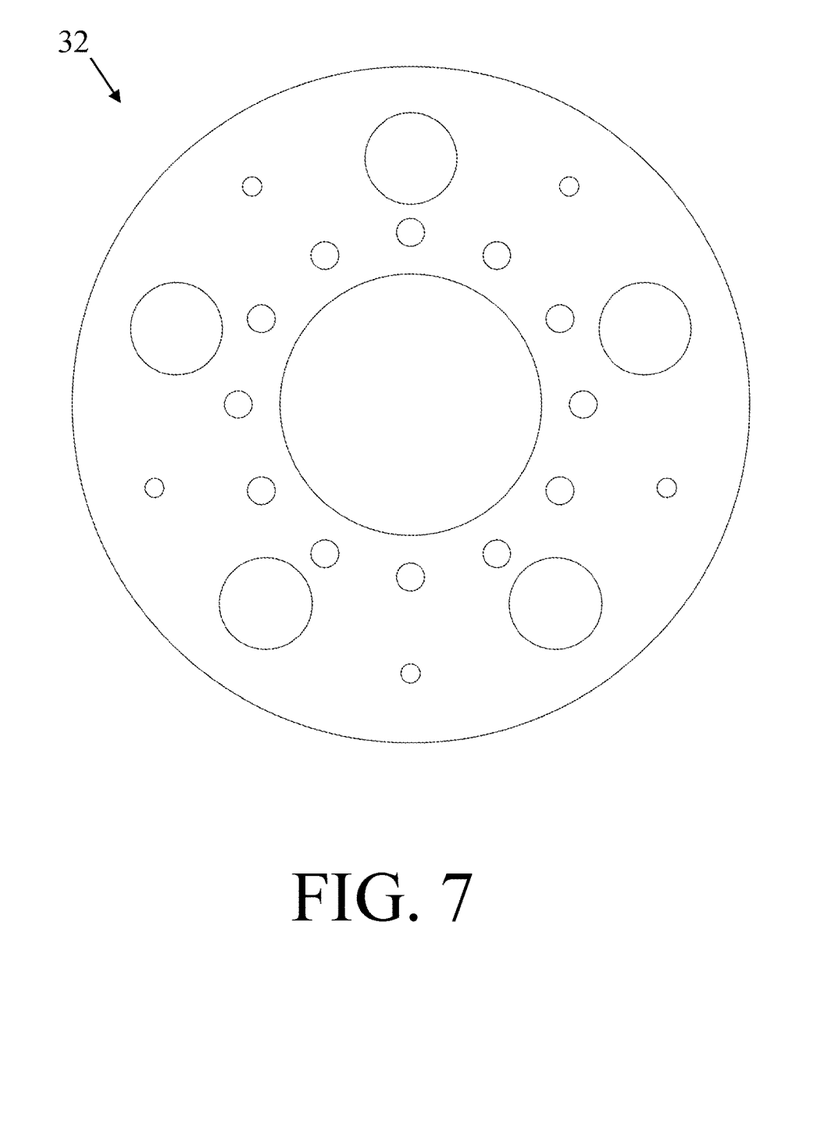
FIG. 7 is a front elevation view of an anchor.

Referring to FIG. 2, anti-slip device 10 has an anchor 32 secured relative to tire support 18. Anchor 32 is shown as a disc that is attaches to tire support 18 by being welded to a rim 34 of tire support 18. Referring to FIG. 3, attachment members 30 can then be attached between anchor disc 32 and attachment points 26 of tread body 14. As shown in FIG. 3, when an anchor disc 32 is used, a plurality of anchor points 36 may be spaced peripherally around disc 32, allowing for a plurality of chains or cables 30 to be attached between anchor points 36 on anchor 32 and attachment points 26 on tire engagement member 28. One example of an anchor disc 32 is shown in FIG. 7. It will be understood that the actual dimensions of anchor disc 32, as well as the numbers and relative sizes of the openings and attachment points on anchor disc 32, will vary with the particular circumstances of use.

It will be understood that anti-spin device 10 may be used with a single tire 16, although the depicted embodiments show it being used with two or "dually" tires 16 in FIGS. 1-3 and 6, and may be used with three side-by-side tires 16 on a vehicle, such as dual-tired pick-up trucks, trucks for tractor trailers, agricultural tractors, skid-steer loaders, etc.

Referring to FIG. 2, in the depicted embodiment, wheel 12 includes first and second tires 16, and has first and second tire supports 18 mounted to the axle. Preferably, anchor 32 is secured between first and second tire supports 18 to provide a more centralized, symmetrical anchor. In particular, engagement bars 28 as shown in FIGS. 1 and 2 are designed to accommodate two tires 16, with anchor 32, attachment points 26, and attachment members 30 positioned between tires 16.

Figure 6:
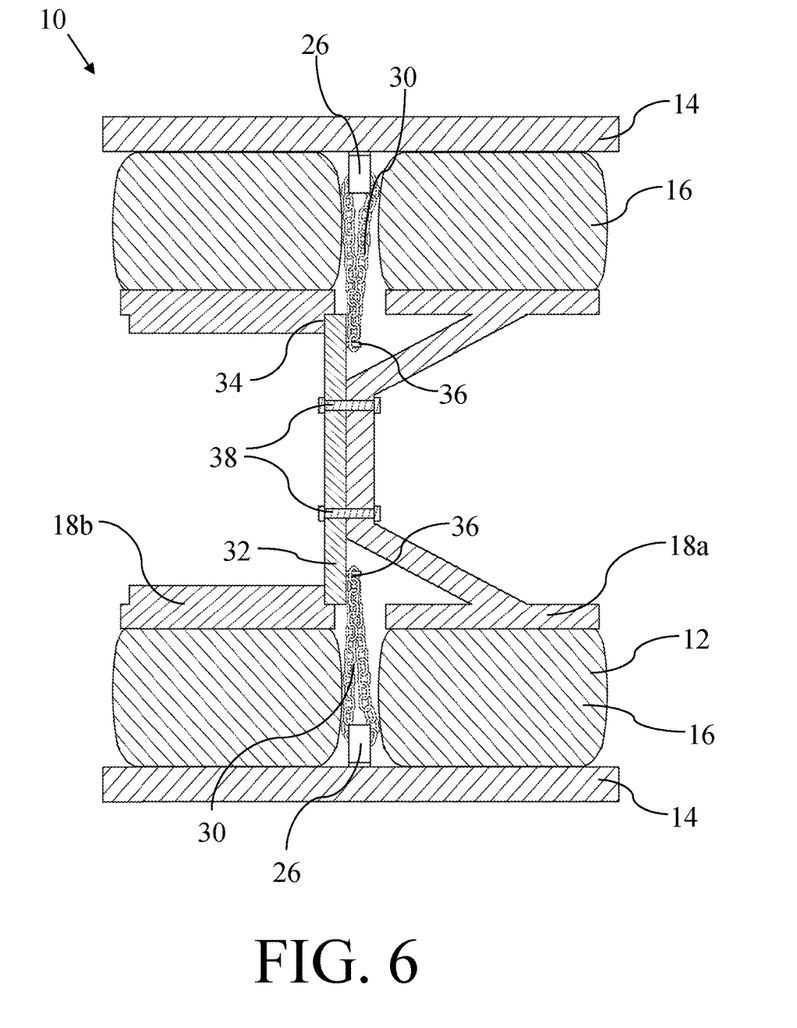
FIG. 6 is a partial cross-sectional view of wheels connected together and secured to a traction cover.

Referring to FIG. 6, in a normal dually arrangement, tire rims 18 are dished to allow them to be attached together such that tires 16 are at a desired spacing. In one embodiment that involves anchor disc 32, a dished rim 18a is replaced with a regular rim 18b that has anchor disc 32 welded to an inner surface 34 of rim 18b. Anchor disc 32 has rim attachment points 38 to attach to dished rim 18a and the position and thickness of anchor disc 32 is designed to duplicate the spacing of tires 16 that would normally be desired when installed. It will be understood that other arrangements may also be used. For example, anchor 32 may be integrally formed with tire rim 18b, or tire rim 18b may act as anchor 32 by providing anchor points 36 directly on rim 18b, as long as the necessary strength is provided. In another example, an anchor disc 32 may be installed between two existing rims 18a. This allows for an easy modification or retrofit onto an existing vehicle. It may also results in a wider track, which may be desired in some circumstances, or something to be avoided in others. Alternatively, custom rims may be designed and manufactured with attachments or attachment points integrally formed to allow a traction cover 14 to be attached.

Figure 4:
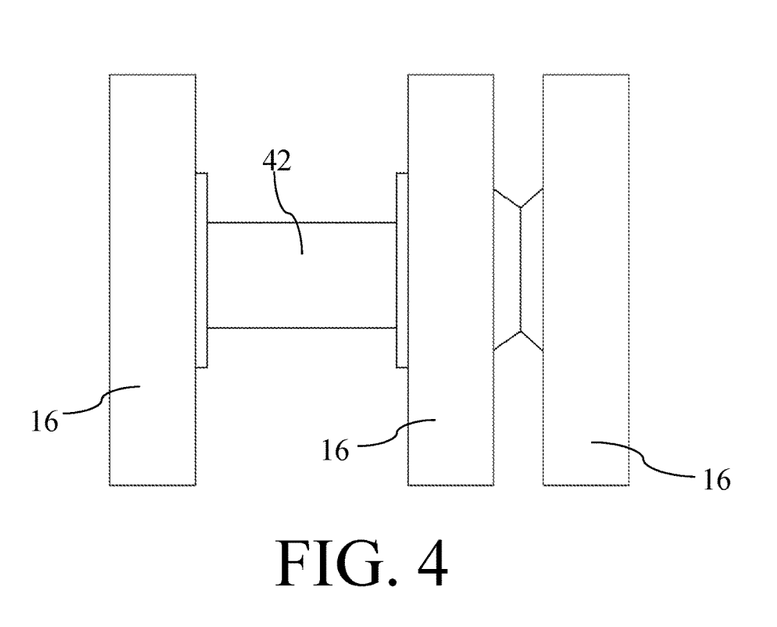
FIG. 4 is a top plan view of wheels connected by an extension spool.
Figure 5:
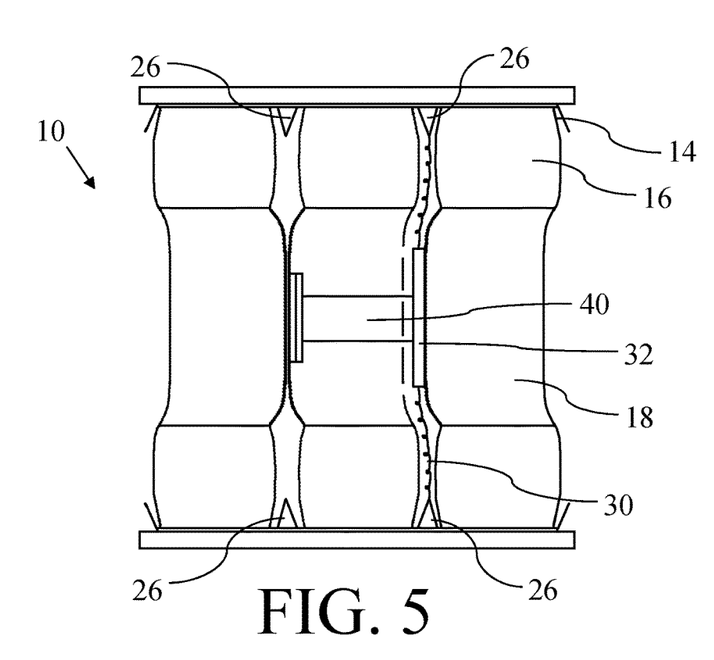
FIG. 5 is a top plan view of wheels connected by an alternate extension spool and covered by a traction cover.

Referring to FIGS. 4 and 5, anti-slip device 10 may be modified to provide wheel 12 with additional tires, such as a third tire 16 and a third tire support 18 if a wider track is desired. Third tire support 18 may be secured to second tire support 18 by an extension spool 40. There may be attachment points 26 between both the first and second and the second and third tires 16, although it is believed that a single set of attachment points 26 should be sufficient in most cases, which also simplifies installation. Should a wide track be desired, a spacer 42 may also be used to secure anti-spin device 10 and widen the assembly. For example, a barrel spacer or a two flange spacer may be used to secure tread body 14 and anchor 32. Anchor 32 may also be attached to or integrally formed with extension spool 40 or spacer 42. It will also be understood that anti-spin device 10 and wheel traction cover 14 may be used with a variety of different tire sizes by adjustment of the length and width of traction cover 14, as well as through the use of a variety of different sized anchor discs 32 designed for the different tire sizes. For example, anchor disc 32 may be adapted to accommodate a 10 hole disc wheel, a blank Dayton™ rim, or a combination of both Budd™ and Dayton™ rims. When used with a single tire 16, the inside of track wear bar 28 may also be adapted to provide an improved fit. Tires 16 may be required to be grooved to hold wear bars 28 in position. With a single tire 16 anti-spin device 10 may be adapted by providing two anti-spin discs 32, and attaching either side of single tire 16 to wear bar 28.

Anti-slip device 10 as described is relatively easy to install, and may be done in the field when warranted by the ground conditions. When installing on a single tire 16, the existing wheel may be removed and replaced with a wheel 12 having a rim 18 with the necessary anchor points 36, or an anchor 32 may be installed on the existing rim. The cover 14 is then placed around the tire 16, and the anchor points 36 that are secured relative to the rim 18 are attached to the attachment points 36 carried by the traction cover 14. When installing on a truck with dually tires, one dually will be removed, and either replaced with a tire 16 and rim 18 having the necessary anchor points 36, or anchor points 36 provided on one of the existing rims 18. When installing a third tire (as vehicles generally do not have three tires), the extension spool 40 will be mounted to the existing set of tires 16. In each case, the traction cover 14 is installed by being wrapped around the tire or tires 16, and the attachment points 26 secured to the anchor 32. In use, the attachments 30 do not increase the frictional engagement between the traction cover 14 and the tire 16 significantly. However, should the traction cover 14 begin to move relative to the tire 16, the attachments 30, which are non-elastic, will pull tight to prevent further relative rotation.

The anti-spin device 10 is provided to eliminate spinning of the tire 16 inside the traction cover 14. The anti-spin device 10 was primarily designed as a safety feature and is particularly beneficial when braking, or when travelling up or down an incline. When the track 14 is mounted on tires 16 and the vehicle is travelling down the track, tire slippage or spinning can greatly reduce the ability of a vehicle to brake effectively, and may result in loss of control. In some cases, for example in wet conditions, if the track 14 is not mounted properly, there would be no braking effect without the use of the anti-spin device 10. Also, by eliminating the ability of the tire 16 to spin inside the track 14, the track assembly becomes more efficient. For example, if the tires 16 would otherwise spin inside the track 14, tire wear will occur, and tires 16 will weaken and eventually require replacement. Referring to FIG. 3, when the attachment member 28 is attached between the anchor 32 on the tire 16 and the attachment points 26 carried by the inner engagement surface 20 of the tread body 14, the attachment member 30 limits the relative movement that is possible between the traction cover 14 and the tire support 18. This prevents the tire 16 from moving independently within the traction cover 14, preventing spinning, and allowing braking or acceleration to occur effectively. In use, the anti-spin device 10 and the inside tire engagement bar 28 cooperate as the tires 16 want to turn relative to the traction cover 14, as the additional relative movement between the tires 16 and the traction cover 14 puts increased pressure on the tire engagement bar or bars 28, which in turn puts more pressure on the tire 16, and less strain on the chain or other attachment member 30 and the anti-spin device 10.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

The embodiments of the invention in which an exclusive property or privilege is claimed are defined as follows:

1. A traction cover configured to engage a set of wheels, each wheel comprising a tire, and a tire support that supports the tire, the set of wheels comprising a first wheel and a second wheel and being mountable to an axle of a vehicle, the traction cover comprising:
   a tread body having an inner engagement surface and an outer tread surface, the inner engagement surface being sized to engage an outer drive surface of the tires;
   a first set of attachment points carried by the inner engagement surface of the tread body;
   an anchor disc comprising a planar surface that is perpendicular to the axle wherein the anchor disc is secured to an inner surface of the tire support of the first wheel and adjacent to the tire support of the second wheel such that an outer perimeter of the planar surface is in direct contact with the inner surface of the tire support of the first wheel, the anchor disc further comprising a set of rim attachment points for structurally attaching the tire support of the second wheel to the first wheel, and a second set of attachment points that are spaced radially outward from the set of rim attachment points and within the outer perimeter of the anchor disc; and
   attachment members attached between the second set of attachment points of the anchor disc and the first set of attachment points of the tread body.

2. The traction cover of claim 1, wherein the first set of attachment points are carried by a tire engagement member that is mounted to the inner engagement surface of the tread body.

3. The traction cover of claim 2, wherein the tire engagement member comprises an elongated body that is orientated transversely to the outer drive surface of the tires.

4. The traction cover of claim 1, wherein the set of wheels further comprises a third wheel, the third wheel comprising a third tire and a third tire support, the third tire support being secured to the second tire support by an extension spool.

5. The traction cover of claim 4, wherein the anchor disc is attached to or integrally formed with the extension spool.

6. The traction cover of claim 1, wherein the second set of attachment points are spaced peripherally around the anchor disc and the attachment members comprise a plurality of chains or cables, each attachment member being attached between respective attachment points of the first and second sets of attachment points.

7. A system for providing an anti-slip tread on a wheel, the system comprising:
   an axle;
   a first wheel comprising a first tire and a first tire support that supports the first tire;
   a second wheel comprising a second tire and a second tire support that supports the second tire, the second tire support being attached to the first tire support, and the first and second tire supports being mounted to the axle;
   an anchor disc comprising a planar surface that is perpendicular to the axle wherein the anchor disc is secured to an inner surface of the first tire support, such that an outer perimeter of the planar surface is in direct contact with the inner surface of the first tire support, the anchor disc further comprising a set of rim attachment points for structurally attaching the tire support of the second wheel to the first wheel, and a second set of attachment points that are spaced radially outward from the set of rim attachment points and within the outer perimeter of the anchor disc;
   an anti-slip tread mounted to an exterior surface of the tire;
   a tire engagement member attached to the anti-slip tread having a first set of attachment points; and
   attachment members attached between the first and second sets of attachment points.

8. A method of preventing a set of wheels from slipping, each wheel comprising, a tire, and a tire support that supports the tire, the set of wheels comprising a first wheel and a second wheel and being mountable to an axle of a vehicle, the method comprising:

installing a traction cover on the set of wheels, the traction cover comprising a tread body having an inner engagement surface and an outer tread surface, the inner engagement surface being sized to engage an outer drive surface of the tires;

securing an anchor disc comprising a planar surface that is perpendicular to the axle to an inner surface of the tire support of the first wheel such that an outer perimeter of the anchor disc is in direct contact with the inner surface of the tire support of the first wheel, the anchor disc further comprising a set of rim attachment points for structurally attaching the tire support of the second wheel to the first wheel, and a second set of attachment points that are spaced radially outward from the set of rim attachment points, the set of rim attachment points and the second set of attachment points being within the outer perimeter of the anchor disc;

securing the second wheel to the first wheel by positioning the anchor disc adjacent to the tire support of the second wheel and structurally securing the tire support of the second wheel to the set of rim attachment points of the anchor disc; and attaching attachment members between the second set of attachment points of the anchor disc and a first set of attachment points carried by the inner engagement surface of the tread body such that the attachment members limit relative movement between the traction cover and the tire supports.

9. The method of claim 8, wherein the first set of attachment points are connected to tire engagement members that are mounted to the inner engagement surface of the tread body.

10. The method of claim 9, wherein the tire engagement member comprises an elongated body that is orientated transversely to the drive surface of the tires.

11. The method of claim 8, wherein the set of wheels further comprises a third wheel, the third wheel comprising a third tire and a third tire support, the third tire support being secured to the second tire support by an extension spool.

12. The method of claim 11, wherein the anchor disc is attached to or integrally formed with the extension spool.

13. The method of claim 8, wherein the second set of attachment points are spaced peripherally around the anchor disc and the attachment members comprise a plurality of chains or cables, each attachment member being attached between respective attachment points of the first and second sets of attachment points.

* * * * *